United States Patent
York et al.

(10) Patent No.: US 6,707,227 B1
(45) Date of Patent: Mar. 16, 2004

(54) HIGH POWER ALTERNATOR FIELD COIL

(75) Inventors: Michael T. York, Chelsea, MI (US); Jeffrey Brabant, Britton, MI (US); Anthony Militello, Ypsilanti, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/316,771

(22) Filed: Dec. 11, 2002

(51) Int. Cl.$^7$ ................................................ H02K 1/22
(52) U.S. Cl. ........................ 310/263; 310/261; 310/179
(58) Field of Search ................................ 310/263, 261, 310/179, 184, 180, 194, 271

(56) References Cited

U.S. PATENT DOCUMENTS

| | | | |
|---|---|---|---|
| 5,483,116 A | | 1/1996 | Kusase et al. |
| 5,519,277 A | | 5/1996 | York et al. |
| 5,539,265 A | | 7/1996 | Harris et al. |
| 5,714,822 A | * | 2/1998 | Kawano et al. ............. 310/179 |
| 5,793,144 A | | 8/1998 | Kusase et al. |
| 5,886,447 A | | 3/1999 | Hatsios et al. |
| 5,886,451 A | | 3/1999 | Hatsios et al. |
| 5,925,964 A | * | 7/1999 | Kusase et al. ............. 310/263 |
| 6,002,194 A | | 12/1999 | Asao |
| 6,011,343 A | * | 1/2000 | Taniguchi .................... 310/263 |
| 6,020,669 A | | 2/2000 | Umeda et al. |
| 6,097,130 A | | 8/2000 | Umeda et al. |
| 6,127,763 A | * | 10/2000 | Nakamura et al. .......... 310/263 |
| 6,166,461 A | | 12/2000 | Kusase et al. |
| 6,225,727 B1 | | 5/2001 | Oohashi et al. |
| 6,307,297 B1 | * | 10/2001 | Bramson et al. ............. 310/263 |
| 6,426,581 B1 | | 7/2002 | York et al. |
| 6,531,802 B2 | * | 3/2003 | Umeda ........................ 310/263 |
| 6,555,944 B1 | * | 4/2003 | York .......................... 310/263 |
| 2002/0005673 A1 | * | 1/2002 | Umeda et al. ......... 310/156.11 |
| 2002/0021052 A1 | | 2/2002 | Asao |
| 2002/0047484 A1 | * | 4/2002 | Umeda ........................ 310/263 |
| 2002/0117934 A1 | | 8/2002 | Kanazawa et al. |
| 2002/0135265 A1 | * | 9/2002 | Umeda ........................ 310/263 |
| 2003/0034708 A1 | * | 2/2003 | Digby et al. ................ 310/194 |

* cited by examiner

*Primary Examiner*—Thanh Lam
(74) *Attorney, Agent, or Firm*—Brinks Hofer Gilson & Lione

(57) ABSTRACT

An alternator rotor prevents the field coil from moving within the rotor assembly in a manner that increases the power density of the alternator. The structure maximizes the available space for the field coil and provides increased dissipation of heat to accomplish the same. Preferably, the outer diameter of the field coil is greater than or equal to the inner diameter of the first and second pole pieces for frictional engagement of the coil assembly to the first and second pole pieces. In this manner, the field coil is compressed to form depressions corresponding to the pole pieces to prevent rotation.

22 Claims, 4 Drawing Sheets

HIGH POWER ALTERNATOR FIELD COIL

FIELD OF THE INVENTION

The present invention relates generally to alternators for automotive vehicles, and more particularly relates to rotors used in such alternators.

BACKGROUND OF THE INVENTION

Currently, the majority of all vehicles driven today use front-end accessory drive alternators that contain Lundell style rotors, also known as "claw pole" rotors. The rotor provides the alternator's magnetic field and rotates within the machine. The rotor includes a coil assembly having a field coil made up of an insulated copper wire or wires wrapped around an electrically insulating bobbin. The bobbin surrounds a steel hub, and insulates the field coil from the steel pole pieces which sandwich the field coil to form north and south poles. The magnetic field is generated when the field coil is energized and a current flows through the wires.

One problem with conventional rotors is preventing rotational movement of the field coil within the rotor assembly. The rotor is driven via a belt by the engine of the vehicle. The engine is constantly changing speeds during operation leading to accelerations and decelerations of the rotor speed. Typical vehicles experience acceleration and deceleration rates of approximately 15,000 RPM/sec with transit excursions as high as 30,000 RPM/sec. Movement of the field coil wires leads to a variety of coil failure including wire fatigue fractures, insulation abrasion, and bobbin insulator wear.

Therefore, it is critical in the rotor design to prevent the field coil from moving within the rotor assembly. Conventional solutions to this problem include locking features formed into the coil assembly and the pole pieces, as well as the use of epoxy fillers or other adhesives to attach the coil assembly to the pole pieces. For example, projections may be formed into the outside face of the bobbin that mate with indented features in the poles to help lock the bobbin and hence coil assembly in place.

Unfortunately, these locking features remove steel from the pole pieces, leading to high magnetic saturation in the poles and reducing power density. In addition, the thick locking protrusions created on the bobbin are made of plastic bobbin material that is a poor conductor of heat, preventing good heat transfer from the coil to the cooler poles and leading to an increase in field coil temperature. Likewise, the use of epoxy filler takes up space that could otherwise be filled by the field coil and prevents good heat transfer, both of which decrease the power density of the alternator. In sum, current methods of locking the field coil in position create unwanted performance tradeoffs.

Accordingly, there exists a need to provide an alternator rotor that prevents the field coil from moving within the rotor assembly while maximizing the available space for the field coil and providing increased dissipation of heat to increase the power density of the alternator.

BRIEF SUMMARY OF THE INVENTION

The present invention provides an alternator rotor that prevents the field coil from moving within the rotor assembly in a manner that increases the power density of the alternator. The structure maximizes the available space for the field coil and provides increased dissipation of heat to accomplish the same. Briefly, the outer diameter of the field coil is preferably greater than or equal to the inner diameter of the first and second pole pieces for frictional engagement of the coil assembly to the first and second pole pieces. This prevents rotation of the field coil. Stated another way, the field coil defines depressions corresponding to pole fingers of the first and second pole pieces. The pole fingers are positioned within the depressions to prevent rotation of the of the coil assembly relative to the first and second pole pieces.

Preferably, the first and second pole pieces compress the field coil of the coil assembly. The field coil may be compressed radially and/or axially by the first and second pole pieces. Generally, the first and second poles include pole fingers and a pole hub, the pole fingers including a first portion extending radially from the pole hub and a second portion extending axially relative to the pole hub. The first portion and/or the second portion of the pole fingers may be positioned within the depressions, thereby preventing rotation.

The lack of any extra locking features and the compression of the field coil increases the amount of copper wire within the rotor and improves heat transfer from the field coil to the pole pieces. The improved heat transfer is a result of both increased contact pressure and increased contact area between the coil assembly and the pole pieces. All of these features improve power density of the alternator, while at the same time securely connecting the field coil to the pole pieces to prevent unwanted movement of the field coil within the rotor assembly.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
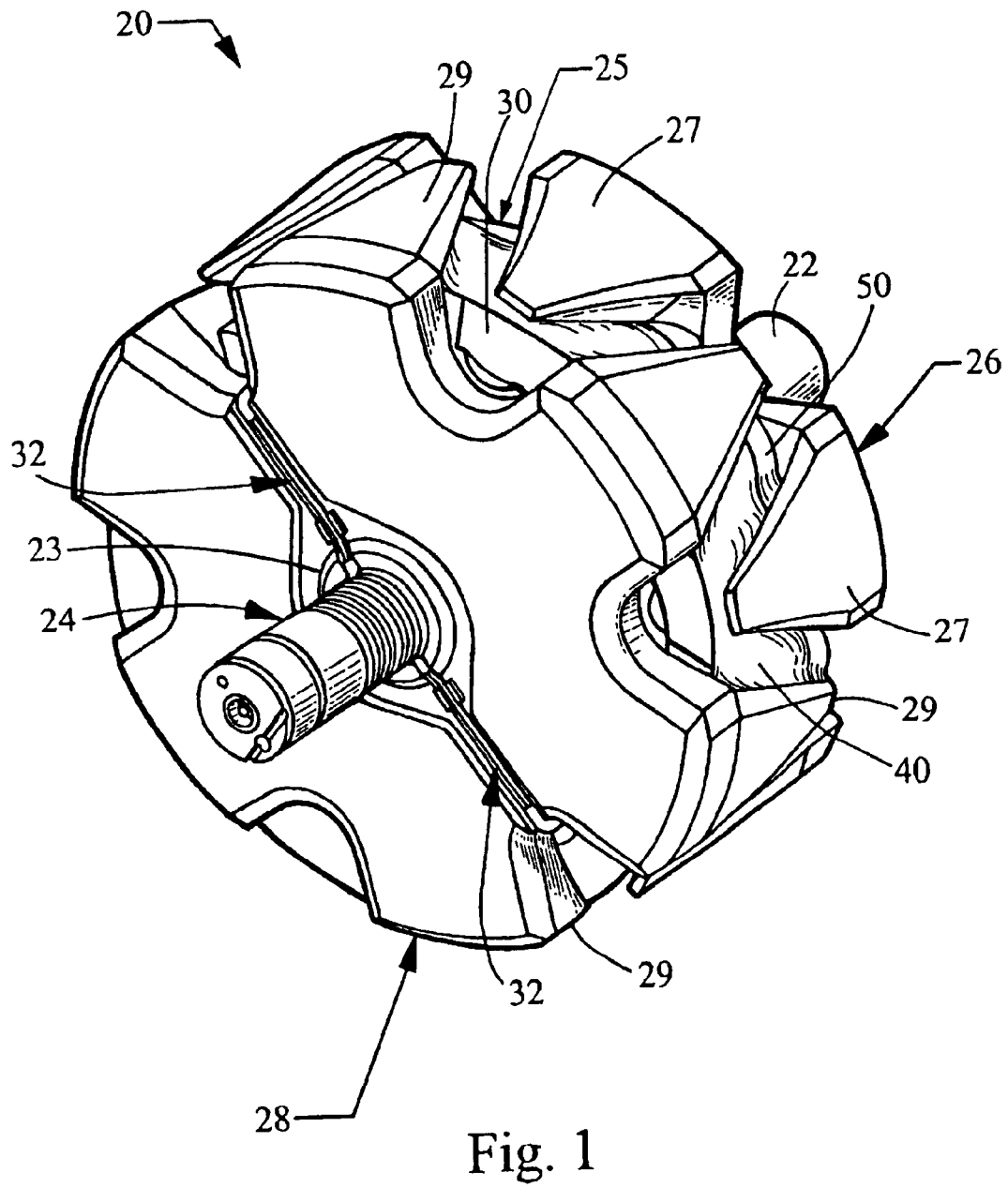
FIG. 1 is a perspective view of an embodiment of a rotor constructed in accordance with the teachings of the present invention.
Figure 2:
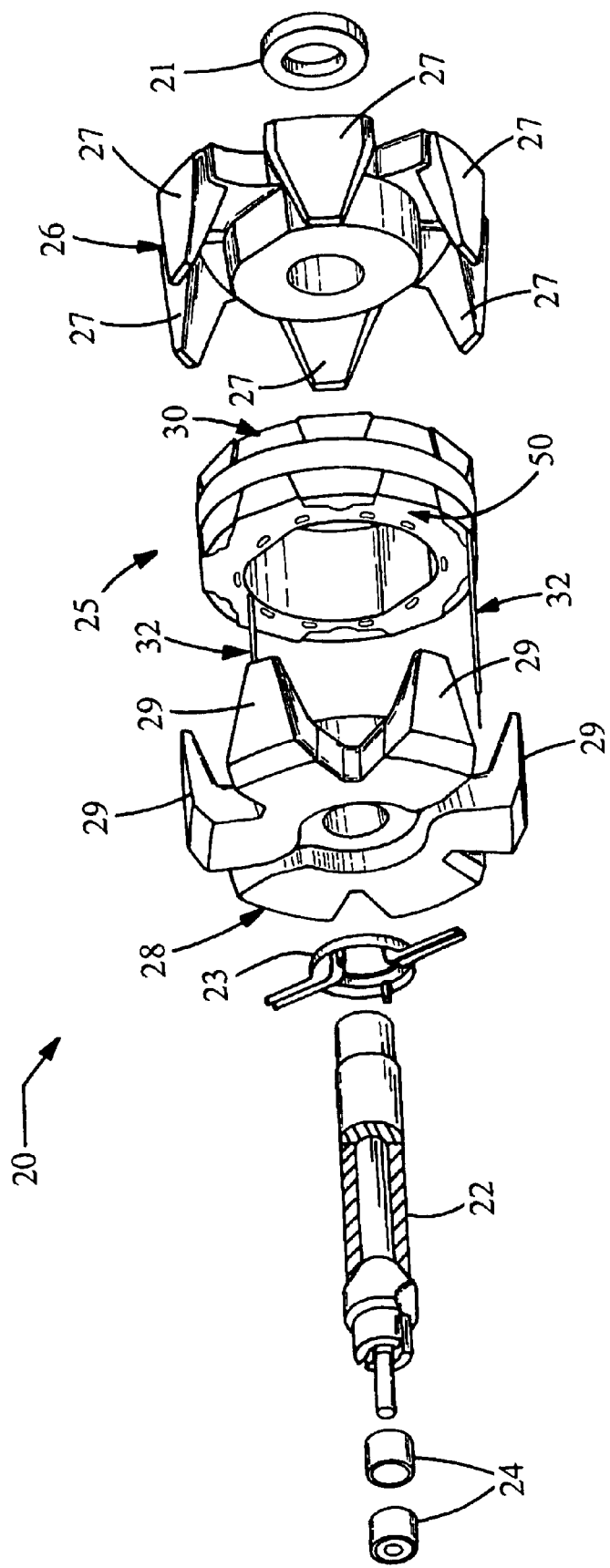
FIG. 2 is an exploded view showing the construction. of the rotor depicted in FIG. 1.

Turning now to the figures, FIGS. 1 and 2 show a rotor assembly or rotor 20 constructed in accordance with the teachings of the invention. Generally, the rotor 20 includes a shaft 22 defining a central axis passing through the center of the rotor and including a slip ring assembly 24 for providing power to the rotor 20. The rotor 20 further includes a first or front pole piece 26 and a second or rear pole piece 28. These opposing pole pieces 26, 28 each include a plurality of pole fingers 27, 29, respectively, which are equidistantly spaced about the periphery of the poles 26, 28. The shaft 22 is inserted through the center of the pole pieces 26, 28, and a stop washer 21 and retaining ring 23 are used in combination to connect the pole pieces 26, 28 to the shaft 22, although other connection mechanisms may be used as is known in the art.

Figure 4:
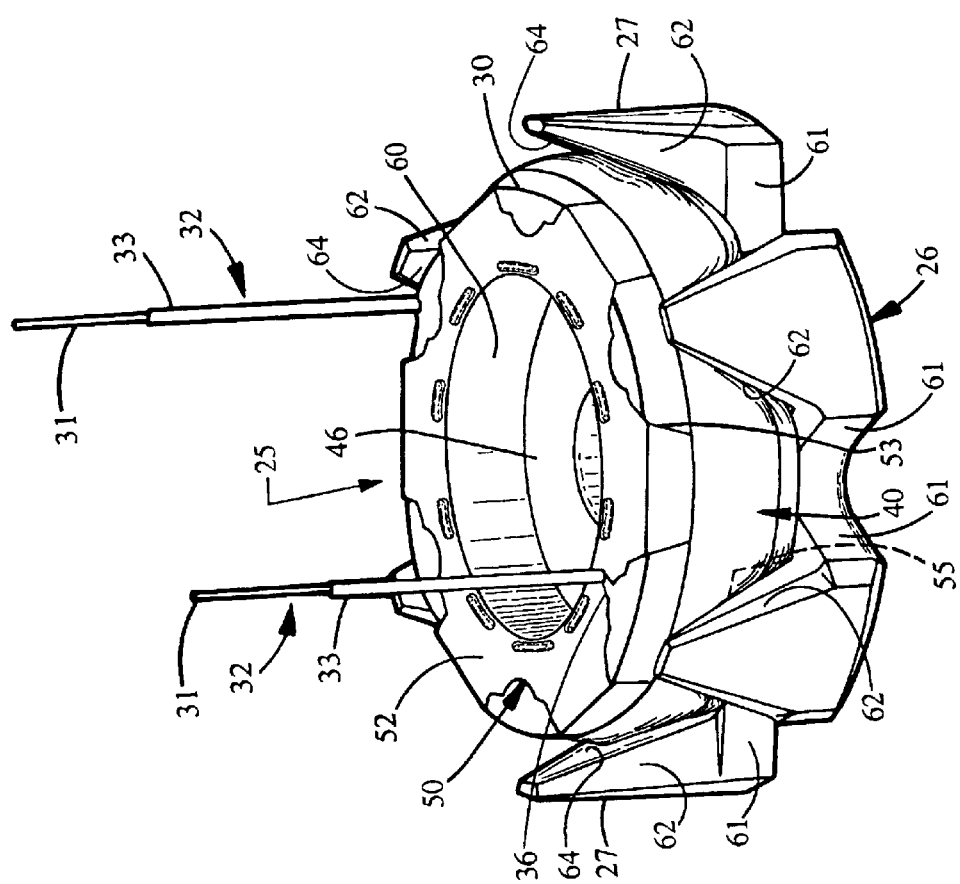
FIG. 4 is a perspective view of the coil assembly of FIG. 3 fitted on a pole piece.
Figure 3:
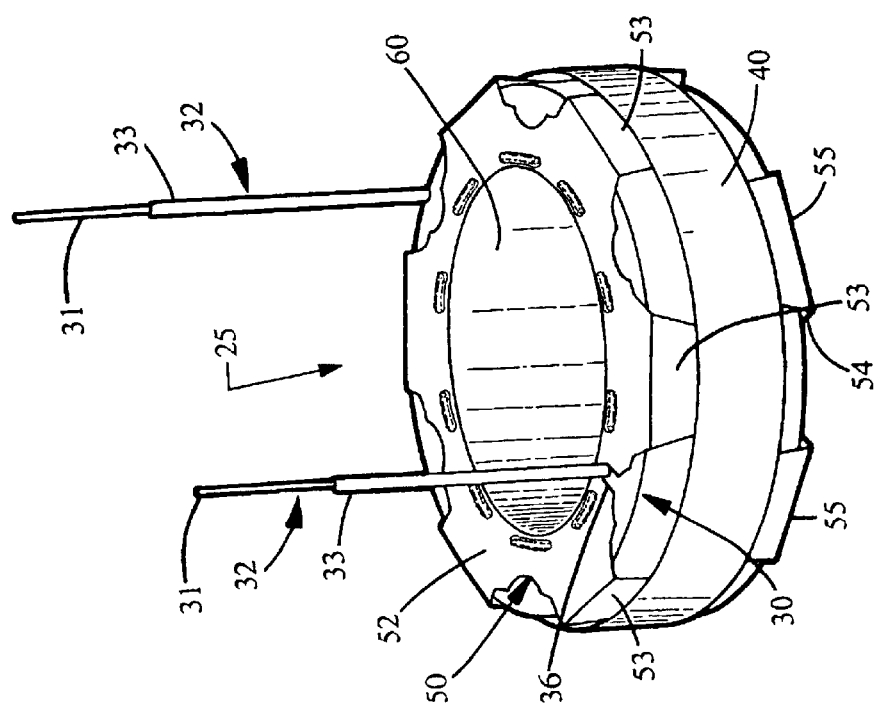
FIG. 3 is a perspective view of the coil assembly.

The poles 26, 28 are used to encase a coil assembly 25 therebetween. The coil assembly 25 is best seen in FIGS. 3 and 4. The coil assembly 25 generally includes a field coil 30 wound onto an insulating bobbin 50. The field coil 30 includes two leads 32 which extend in a slot along the outer surface of the rear pole 28 for internal connection to the slip ring assembly 24. The leads 32 include a wire 31 (shown in FIGS. 2 and 3) which is covered with insulation 33 to prevent electrical shorts from the leads 32 to the steel pole pieces 26, 28. When the field coil 30 is powered via the slip ring assembly 24 and leads 32, a magnetic field is generated which flows through the pole pieces 26, 28, while the entire rotor assembly 20 is rotated via shaft 22 within the alternator.

The bobbin 50 is utilized to electrically insulate the field coil 30 from the pole pieces 26, 28. A single piece construction may be employed, although a multiple piece construction is preferred. The construction of the bobbin 50 will not be described in detail here, however one exemplary bobbin is described in co-pending U.S. application Ser. No. 10/264,778 filed Oct. 4, 2002, the disclosure of which is hereby incorporated by reference in its entirety. Suffice it to say, and with reference to FIGS. 3 and 4, the bobbin 50 includes a first end cap 52 and a second end cap 54 attached to opposing ends of a cylinder 60. Each end cap 52, 54 includes a plurality of flaps 53, 55 which project radially outwardly and are equidistantly spaced about the end caps 52, 54. The flaps 53, 55 are numbered, sized, and structured to correspond with the fingers 27, 29 of the pole pieces 26, 28. Each of the plurality of flaps 53, 55 are folded over the outer surface of the field coil 30, and a layer of tape 40 is applied, as shown in FIG. 3. At least one of the end caps 52, 54 includes a small slot 36 for guiding the leads 32 of the field coil 30.

The coil assembly 25 is pressed onto the center hub 46 of one pole, such as pole 26 as shown in FIG. 4. The opposing pole 28 and its hub (not shown) is then pressed onto the opposing end of the coil assembly 25 such that the faces of each pole hub 46 coming in contact with each other. The shaft 22 is press-fit through bores defined in the poles 26, 28, keeping them in contact with each other, as shown in FIG. 1. It will be recognized that for some rotors, the hub may be a separate piece and not integrally formed with the pole pieces, and hence the coil assembly 25 will be attached to the hub in a manner dictated by the particular rotor structure.

In accordance with the present invention, the coil assembly 25 and pole pieces 26, 28 are structured to prevent unwanted motion of the coil assembly 25 within the rotor 20. First, a calculation is made of the cross sectional area of the pocket that will contain the field coil 30 on the rotor 20. More particularly, and as best seen in FIG. 4, the fingers 27, 29 each include a first portion 61 extending radially away from the pole hub 46. The fingers 27, 29 further include a second portion 62 extending axially from the first portion 61 and relative to the pole hub 46. The second portions 62 have an inner surface 64 which defines an inner diameter of each pole piece 26, 28. This inner diameter defined by the fingers 27, 29, in relation to the hub 46, determines the size, including area, of the pocket that will contain the field coil 30. As shown in the figures, the inner diameter varies from a minimum to a maximum value since the inner surfaces 64 are sloped radially as the fingers 27, 29 extend axially relative to the hub 46.

Once the inner diameter and area of the pocket is obtained, the area of coil wire is determined so that the outer diameter of the field coil 30 will be greater than or equal to the inner diameter of the first and second pole pieces 26, 28. In addition, the field coil area may also be larger than the pocket formed by the first and second poles pieces. The excess coil area, i.e. the portion of the coil that would extend outside the pocket area, is displaced both axially and radially by the pole pieces 26, 28. This provides frictional engagement between the coil assembly 30 and the first and second pole pieces 26, 28 that is sufficient to prevent rotation of the field coil 25. Preferably, the pole fingers 27, 29 will significantly deform the field coil 30 during assembly. That is, the field coil 30 is compressed, forcing the coil to generally form a zigzag pattern around the pole fingers 27, 29. When the inner surfaces 64 of the fingers 27, 29 are sloped as depicted, the outer diameter of the field coil 30 is set greater than or equal to smallest inner diameter of the first and second pole pieces 26, 28. In accordance with these principles, the field coil 30 is wound around a bobbin 50 to a specified outer diameter or coil area. The bobbin flaps 53, 55 are folded over the field coil 30 and taped on the outside diameter by tape 40, as shown in FIG. 3. As is known, the tape 40 can be eliminated.

Figure 5:
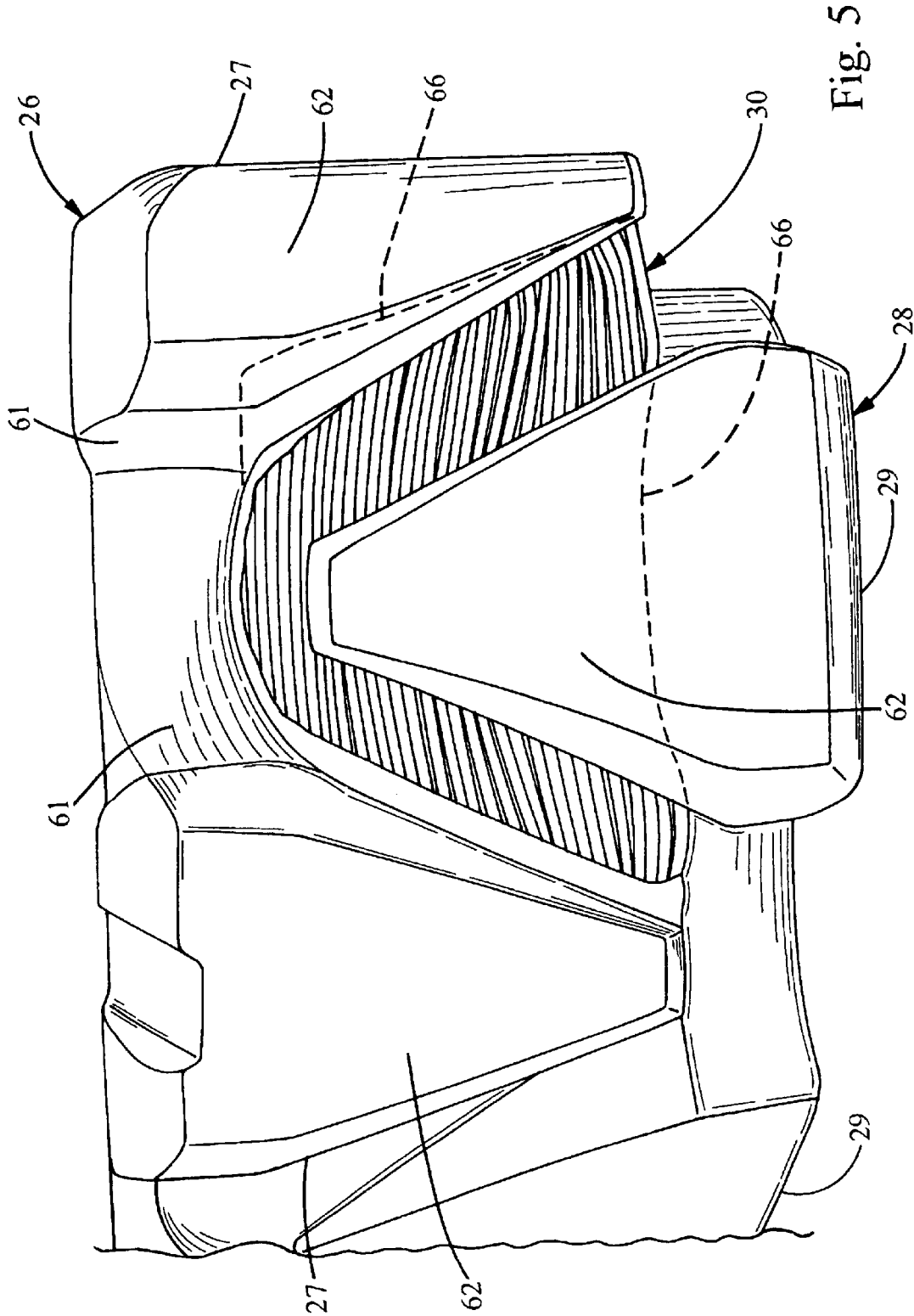
FIG. 5 is an enlarged front view of the rotor depicted in FIG. 1.

As best seen in the enlarged view of FIG. 5 (with the tape 40 removed), the coil assembly 25 is then assembled between two pole pieces 26, 28 by applying an appropriate force necessary on each pole 26, 28 to deform the field coil 30 around the pole fingers 27, 29 and bring the pole hubs 46 in contact with each other. The field coil 30 is deformed into a zigzag pattern around each pole finger 27, 29 in both an axial and a radial direction. Stated another way, the field coil 30 defines depressions 66 that are sized and structured to correspond to the fingers 27, 29 of the pole pieces 26, 28. The depressions extend both axially and radially to correspond with the first portions 61 and second portions 62 of the fingers 27, 29. The pole fingers 27, 29 of the first and second pole pieces 26, 28 are positioned within the depressions 66 to prevent rotation of the of the coil assembly 25 and field coil 30 relative to the first and second pole pieces 26, 28.

As previously indicated, the shaft 22 is inserted through the two pole pieces 26, 28 while they are held together to prevent them from separating due to the resilient force of the deformed field coil 30. If necessary, a metal stake (not shown) can be employed to retain the pole pieces 26, 28 in the correct position on the shaft 22. The stake can move metal from the surface of the pole 26, 28 surrounding the shaft 22 into grooves machined in the shaft 22.

The zigzag pattern around the pole fingers 27, 29 locks the field coil 30 together to the poles 26, 28, preventing unwanted rotation of the coil assembly 25. In addition, the high-pressure contact and increased contact area between the field coil 30 (on its outside diameter and end surfaces) and the pole fingers 27, 29, enhances the heat transfer from the coil 30 to the pole pieces 26, 28. The cooler field coil 30 has a lower electrical resistance leading to increased field current that results in increased magnetic field strength and power density of the alternator. Further, compression of the field coil 30 allows more wire to be wound into the coil, further increasing power density. At the same time, the coil assembly 25 and field coil 30 are securely attached to the pole pieces 26, 28, thereby preventing unwanted rotation.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A rotor for an alternator comprising:
   a coil assembly defined by a bobbin and a field coil, the coil assembly having first and second ends;
   the bobbin having a cylinder and opposing first and second end caps corresponding the first and second ends of the coil assembly;
   the field coil being wound onto the bobbin between the first and second end caps, the field coil defining an outer diameter;
   first and second pole pieces positioned at the first and second ends of the coil assembly and encasing the coil assembly therebetween, the first and second pole pieces each having pole fingers extending axially to define an inner diameter;
   a shaft fit through the first and second pole pieces and connected thereto to maintain the position of the first and second pole pieces relative to the coil assembly; and
   the outer diameter of the field coil being greater than the inner diameter of the first and second pole pieces for frictional engagement of the coil assembly to the first and second pole pieces.

2. The rotor of claim 1, wherein the first and second pole pieces compress the field coil of the coil assembly.

3. The rotor of claim 2, wherein the field coil is compressed radially by the first and second pole pieces.

4. The rotor of claim 2, wherein the field coil is compressed axially by the first and second pole pieces.

5. The rotor of claim 1, wherein the field coil includes depressions corresponding to the pole fingers of the first and second pole pieces.

6. The rotor of claim 5, wherein the depressions extend radially.

7. The rotor of claim 5, wherein the depressions extend axially.

8. The rotor of claim 5, wherein the pole fingers of the first and second pole pieces are positioned within the depressions.

9. The rotor of claim 1, wherein the frictional engagement of the coil assembly to the first and second pole pieces prevents rotation of the coil assembly 1relative to the first and second pole pieces.

10. The rotor of claim 1, wherein the pole fingers each have an inner surface defining the inner diameter of the first and second pole pieces, the inner surface being sloped radially to define an increasing inner diameter as the pole fingers extend axially away from the main body, and wherein the largest outer diameter of the field coil is greater than the average inner diameter of the first and second pole pieces.

11. The rotor of claim 1, wherein the outer diameter of the field coil is greater than the inner diameter of the first and second pole pieces at respective axial positions.

12. The rotor of claim 1, wherein the pole fingers define a varying inner diameter, and wherein the outer diameter of the field coil is greater than or equal to the inner diameter of the first and second pole pieces near the axial middle of the field coil.

13. A rotor for an alternator comprising:
   a coil assembly defined by a bobbin and a field coil, the coil assembly having first and second ends;
   the bobbin having a cylinder and opposing first and second end caps corresponding the first and second ends of the coil assembly;
   the field coil being wound onto the bobbin between the first and second end caps;
   first and second pole pieces positioned at the first and second ends of the coil assembly to encase the coil assembly therebetween, the first and second pole pieces each having pole fingers having a first portion extending radially outwardly and a second portion extending axially;
   a shaft fit through the first and second pole pieces and connected thereto to maintain the position of the first and second pole pieces relative to the coil assembly; and
   the field coil defining depressions corresponding to the pole fingers of the first and second pole pieces, the pole fingers of the first and second pole pieces being positioned within the depressions to prevent rotation of the of the coil assembly relative to the first and second pole pieces.

14. The rotor of claim 13, wherein the field coil defines an outer diameter and the pole fingers define an inner diameter, the outer diameter of the field coil being greater than or equal to the inner diameter of the first and second pole pieces.

15. The rotor of claim 14, wherein the outer diameter of the field coil is greater than the inner diameter of the first and second pole pieces at respective axial positions.

16. The rotor of claim 14, wherein the pole fingers define a varying inner diameter, and wherein the outer diameter of the field coil is greater than or equal to the inner diameter of the first and second pole pieces near the axial middle of the field coil.

17. The rotor of claim 13, wherein the first and second pole pieces compress the field coil of the coil assembly to define the depressions therein.

18. The rotor of claim 13, wherein the depressions extend radially.

19. The rotor of claim 13, wherein the depressions extend axially.

20. The rotor of claim 18, wherein the first portion of the pole fingers are positioned within the depressions.

21. The rotor of claim 19, wherein the second portion of the pole fingers are positioned within the depressions.

22. A rotor for an alternator comprising:
   a coil assembly defined by a bobbin and a field coil, the coil assembly having first and second ends;
   the bobbin having a cylinder and opposing first and second end caps corresponding the first and second ends of the coil assembly;
   the field coil being wound onto the bobbin between the first and second end caps, the field coil defining an outer diameter and a cross sectional area;
   first and second pole pieces having a plurality of axially extending fingers having an inner surface;
   wherein the first and second pole pieces are positioned at the first and second ends of the coil assembly encasing the coil assembly therebetween in a pocket formed by the pole pieces, the cross sectional area of the pocket being smaller than the cross sectional area of the coil assembly causing deformation of the field coil; and
   a shaft fit through the first and second pole pieces and connected thereto to maintain the position of the first and second pole pieces relative to the coil assembly.

* * * * *